US011647369B2

(12) United States Patent
Jantzi et al.

(10) Patent No.: US 11,647,369 B2
(45) Date of Patent: May 9, 2023

(54) METHOD AND SYSTEM FOR DYNAMIC APN SELECTION

(71) Applicant: BlackBerry Limited, Waterloo (CA)

(72) Inventors: Jason Wayne Jantzi, St. Clements (CA); Scott Leonard Dill, Paris (CA); Jesse William Bennett, Apex, NC (US); Mark Edward Reaume, Waterloo (CA); Mahendra Fuleshwar Prasad, Waterloo (CA); Alexander Karl Levato, Toronto (CA); Yu Gao, Waterloo (CA)

(73) Assignee: BlackBerry Limited, Waterloo (CA)

( * ) Notice: Subject to any disclaimer, the term of this patent is extended or adjusted under 35 U.S.C. 154(b) by 141 days.

(21) Appl. No.: 17/175,019

(22) Filed: Feb. 12, 2021

(65) Prior Publication Data

US 2021/0168576 A1 Jun. 3, 2021

Related U.S. Application Data

(63) Continuation of application No. 15/730,447, filed on Oct. 11, 2017, now Pat. No. 10,952,052.

(51) Int. Cl.
*H04W 4/70* (2018.01)
*H04W 84/18* (2009.01)
(Continued)

(52) U.S. Cl.
CPC ........... *H04W 4/70* (2018.02); *H04L 41/0813* (2013.01); *H04L 43/0811* (2013.01);
(Continued)

(58) Field of Classification Search
None
See application file for complete search history.

(56) References Cited

U.S. PATENT DOCUMENTS

| 2006/0271517 | A1 | 11/2006 | Deloach, Jr. |
| 2008/0186882 | A1* | 8/2008 | Scherzer ............... H04W 24/10 370/310 |

(Continued)

FOREIGN PATENT DOCUMENTS

| CA | 2793439 C | 8/2013 |
| WO | WO-2008046264 A1 * | 4/2008 ............. H04L 12/66 |
| WO | WO-2011024030 A1 * | 3/2011 ............. H04W 8/02 |

OTHER PUBLICATIONS

European Examination Report; Application No. 18198151.5; dated Jun. 25, 2021; 6 pages.
(Continued)

*Primary Examiner* — Kodzovi Acolatse
(74) *Attorney, Agent, or Firm* — Conley Rose, P.C.; J. Robert Brown, Jr.

(57) ABSTRACT

A method for updating communication parameters on a mobile device, the method including sending a communication from the mobile device to a server, the communication including a location of the mobile device; receiving at the mobile device, responsive to the communication, a new communication parameter; reconfiguring the mobile device with the new communication parameter; and sending a second communication from the mobile device to the server, the second communication using the new communication parameter.

17 Claims, 6 Drawing Sheets

(51) Int. Cl.
| | |
|---|---|
| *H04W 84/00* | (2009.01) |
| *H04L 67/02* | (2022.01) |
| *H04L 41/0813* | (2022.01) |
| *H04L 43/0811* | (2022.01) |
| *H04W 88/10* | (2009.01) |
| *H04W 52/02* | (2009.01) |
| *H04L 67/00* | (2022.01) |
| *H04L 67/12* | (2022.01) |

(52) U.S. Cl.
CPC .............. *H04L 67/02* (2013.01); *H04L 67/12* (2013.01); *H04L 67/34* (2013.01); *H04W 52/0212* (2013.01); *H04W 52/0222* (2013.01); *H04W 52/0254* (2013.01); *H04W 52/0258* (2013.01); *H04W 84/005* (2013.01); *H04W 84/18* (2013.01); *H04W 88/10* (2013.01)

(56) References Cited

U.S. PATENT DOCUMENTS

| | | | | |
|---|---|---|---|---|
| 2011/0039518 | A1* | 2/2011 | Maria | H04W 12/06 455/406 |
| 2011/0122858 | A1 | 5/2011 | Yashiro et al. | |
| 2013/0002483 | A1 | 1/2013 | Rowitch et al. | |
| 2013/0023284 | A1* | 1/2013 | Stanger | G06Q 30/0207 707/825 |
| 2013/0039337 | A1 | 2/2013 | Hwang et al. | |
| 2013/0185421 | A1 | 7/2013 | Yang | |
| 2014/0010185 | A1* | 1/2014 | Morita | H04W 76/16 370/329 |
| 2014/0112328 | A1 | 4/2014 | Wang | |
| 2015/0004997 | A1 | 1/2015 | Gao et al. | |
| 2015/0195364 | A1* | 7/2015 | Petersen | H04W 4/44 713/168 |
| 2015/0195760 | A1 | 7/2015 | Sanz et al. | |
| 2015/0201322 | A1 | 7/2015 | Kim et al. | |
| 2016/0014692 | A1 | 1/2016 | Kim et al. | |
| 2016/0192263 | A1* | 6/2016 | Zembutsu | H04W 36/12 370/331 |
| 2016/0295544 | A1 | 10/2016 | Jiang et al. | |
| 2017/0078156 | A1 | 3/2017 | Lazarescu et al. | |
| 2017/0111315 | A1 | 4/2017 | Long | |
| 2017/0180929 | A1 | 6/2017 | Cavendish et al. | |
| 2017/0180963 | A1 | 6/2017 | Cavendish et al. | |
| 2017/0265100 | A1 | 9/2017 | Ryu et al. | |
| 2017/0289788 | A1* | 10/2017 | Lalwaney | H04L 41/0803 |
| 2017/0353452 | A1 | 12/2017 | Wang | |
| 2018/0103413 | A1* | 4/2018 | Hosey | H04W 48/04 |
| 2018/0109433 | A1* | 4/2018 | Nagaraj | H04L 41/22 |
| 2018/0167906 | A1* | 6/2018 | Chellamani | H04W 4/90 |
| 2018/0248787 | A1 | 8/2018 | Rajagopal et al. | |
| 2019/0110154 | A1 | 4/2019 | Jantzi et al. | |

OTHER PUBLICATIONS

Office Action dated Nov. 27, 2018; U.S. Appl. No. 15/730,447, filed Oct. 11, 2017; 11 pages.
Final Office Action dated Apr. 2, 2019; U.S. Appl. No. 15/730,447, filed Oct. 11, 2017; 10 pages.
Advisory Action dated Jun. 18, 2019; U.S. Appl. No. 15/730,447, filed Oct. 11, 2017; 5 pages.
Office Action dated Jul. 15, 2019; U.S. Appl. No. 15/730,447, filed Oct. 11, 2017; 17 pages.
Final Office Action dated Oct. 24, 2019; U.S. Appl. No. 15/730,447, filed Oct. 11, 2017; 12 pages.
Advisory Action dated Jan. 13, 2020; U.S. Appl. No. 15/730,447, filed Oct. 11, 2017; 5 pages.
Office Action dated Apr. 20, 2020; U.S. Appl. No. 15/730,447, filed Oct. 11, 2017; 13 pages.
Final Office Action dated Aug. 25, 2020; U.S. Appl. No. 15/730,447, filed Oct. 11, 2017; 15 pages.
Notice of Allowance dated Nov. 12, 2020; U.S. Appl. No. 15/730,447, filed Oct. 11, 2017; 13 pages.
European Partial Search Report; Application No. 18198151.5; dated Feb. 28, 2019; 15 pages.
European Extended Search Report; Application No. 18198151.5; dated Jun. 12, 2019; 12 pages.
European Examination Report; Application No. 18198151.5; dated Dec. 8, 2020; 7 pages.

\* cited by examiner

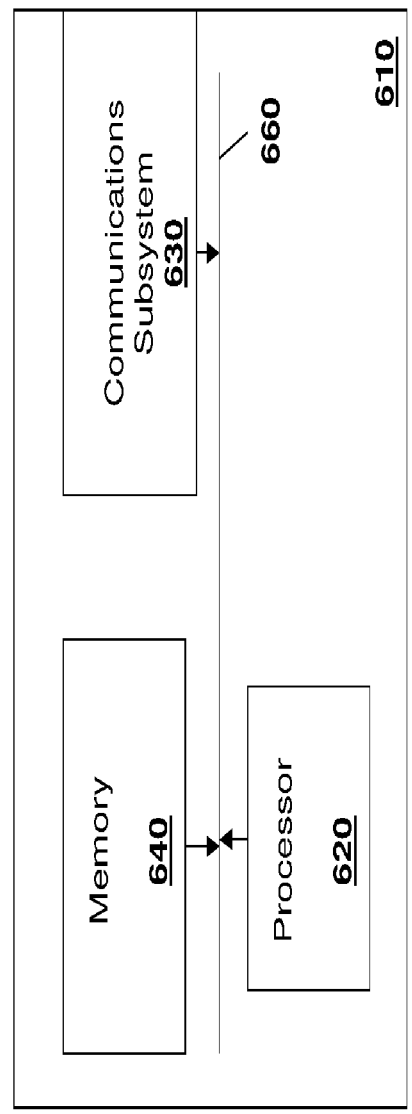

METHOD AND SYSTEM FOR DYNAMIC APN SELECTION

FIELD OF THE DISCLOSURE

The present disclosure relates to network connectivity, and in particular relates to latency for network connectivity.

BACKGROUND

Internet of Things (IoT) devices, such as vehicle monitoring devices, periodically need to connect to a network element such as a server or cloud service and provide reports. Traditionally, devices connect to the network in the same way, no matter where they are located.

However, call setup when a device is roaming can introduce significant latency. This in turn means that a modem or communications subsystem on the mobile device needs to be awake for long periods of time.

The communications subsystem on a mobile device can use significant power resources. For power limited IoT devices, having a communications subsystem operating for long periods of time can significantly drain power resources, thereby reducing the useful life of the IoT device.

BRIEF DESCRIPTION OF THE DRAWINGS

The present disclosure will be better understood with reference to the drawings, in which:

FIG. 6 is a block diagram of an example computing device capable of being used in accordance with the embodiments of the present disclosure.

DETAILED DESCRIPTION OF THE DRAWINGS

Figure 1:
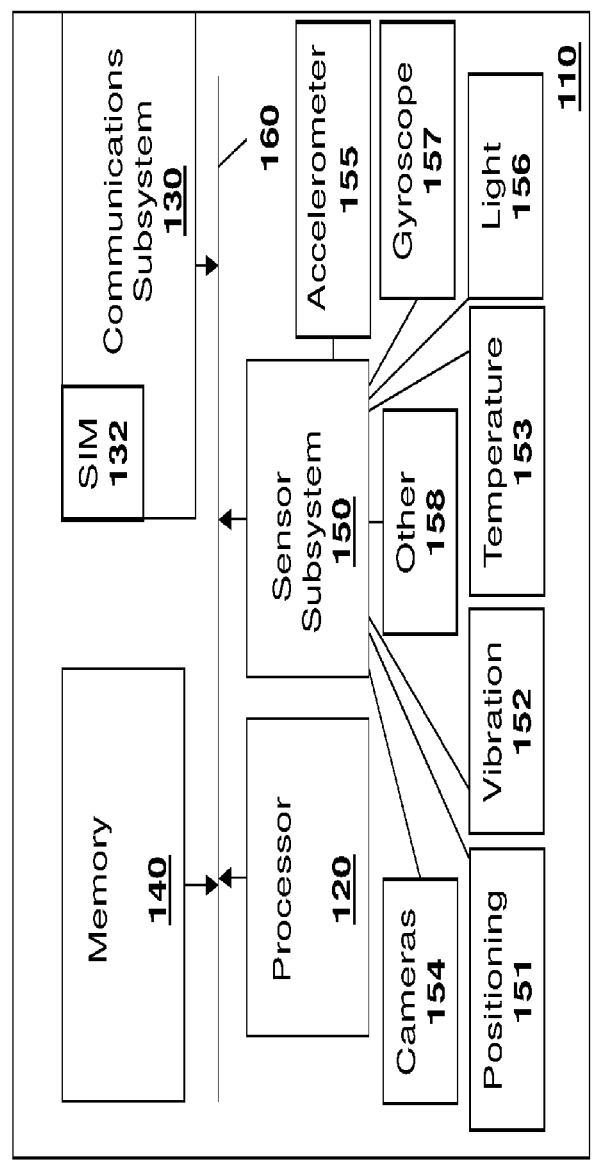
FIG. 1 is a block diagram of an example sensor apparatus for use with the embodiments of the present disclosure.

The present disclosure provides a method for updating communication parameters on a mobile device, the method comprising: sending a communication from the mobile device to a server, the communication including a location of the mobile device; receiving at the mobile device, responsive to the communication, a new communication parameter; reconfiguring the mobile device with the new communication parameter; and sending a second communication from the mobile device to the server, the second communication using the new communication parameter.

The present disclosure further provides a mobile device comprising: a processor; and a communications subsystem, wherein the mobile device is configured to: send a communication from the mobile device to a server, the communication including a location of the mobile device; receive at the mobile device, responsive to the communication, a new communication parameter; reconfigure the mobile device with the new communication parameter; and send a second communication from the mobile device to the server, the second communication using the new communication parameter.

The present disclosure further provides a computer readable medium for storing instruction code, which, when executed by a processor of a mobile device, cause the mobile device to: send a communication from the mobile device to a server, the communication including a location of the mobile device; receive at the mobile device, responsive to the communication, a new communication parameter; reconfigure the mobile device with the new communication parameter; and send a second communication from the mobile device to the server, the second communication using the new communication parameter.

The embodiments of the present disclosure are described below using a sensor apparatus within a vehicle monitoring system as an example. However, the present disclosure is not limited to use for vehicles, and the embodiments can be used in other scenarios, including for any mobile device that is roaming in different cellular networks.

In vehicle operations, sensor systems may be included on the vehicle and have a plurality of sensor apparatuses operating remotely from a central monitoring station to provide remote sensor data to a management or monitoring hub. For example, one sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, operational parameters such as tire pressure or engine temperature, that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus that is capable of providing data or information from sensors associated with the sensor apparatus to a central monitoring or control station. Sensors associated with the sensor apparatus may either be physically part of the sensor apparatus, for example a built-in global positioning system (GPS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses.

One sensor apparatus is shown with regard to FIG. 1. The sensor apparatus of FIG. 1 is however merely an example and other mobile devices could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used.

Further, in some embodiments, sensor apparatus 110 may act as a gateway, and may communicate with other sensor apparatuses (not shown) on the trailer, where the other sensor apparatuses may act as hubs for a subset of the sensors on the vehicle or trailer.

Communications between the various elements of sensor apparatus 110 may be through an internal bus 160 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

In other cases, sensor apparatus 110 may be affixed to stationary objects including buildings, lamp posts, fences, cranes, among other options.

Such sensor apparatus 110 may be a power limited device. For example sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
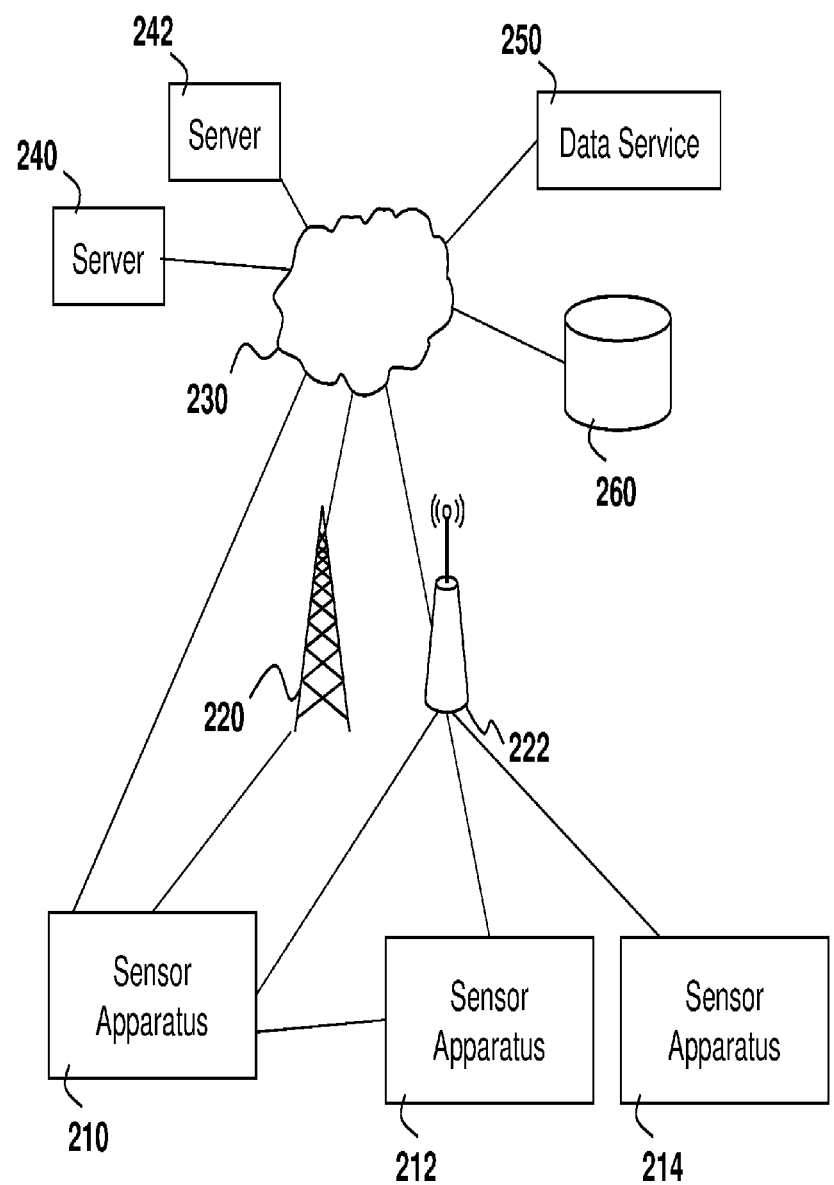
FIG. 2 is a block diagram showing an example environment for a sensor apparatus in accordance with the embodiments of the present disclosure.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point. For example, access point 222 may be a WiFi router or a private router network. Also, a private router network may have a path from the APN to a server, and may reduce network latency based on a location of the sensor apparatus in some embodiments.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with image capture apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, system information such as tire pressure or vibration sensor readings, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a facilities management server, and direct loading and unloading of goods to vehicles in particular bays of the facility.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, low latency access point names, virtual SIM information, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 or processing at those sensor apparatuses.

Figure 3:
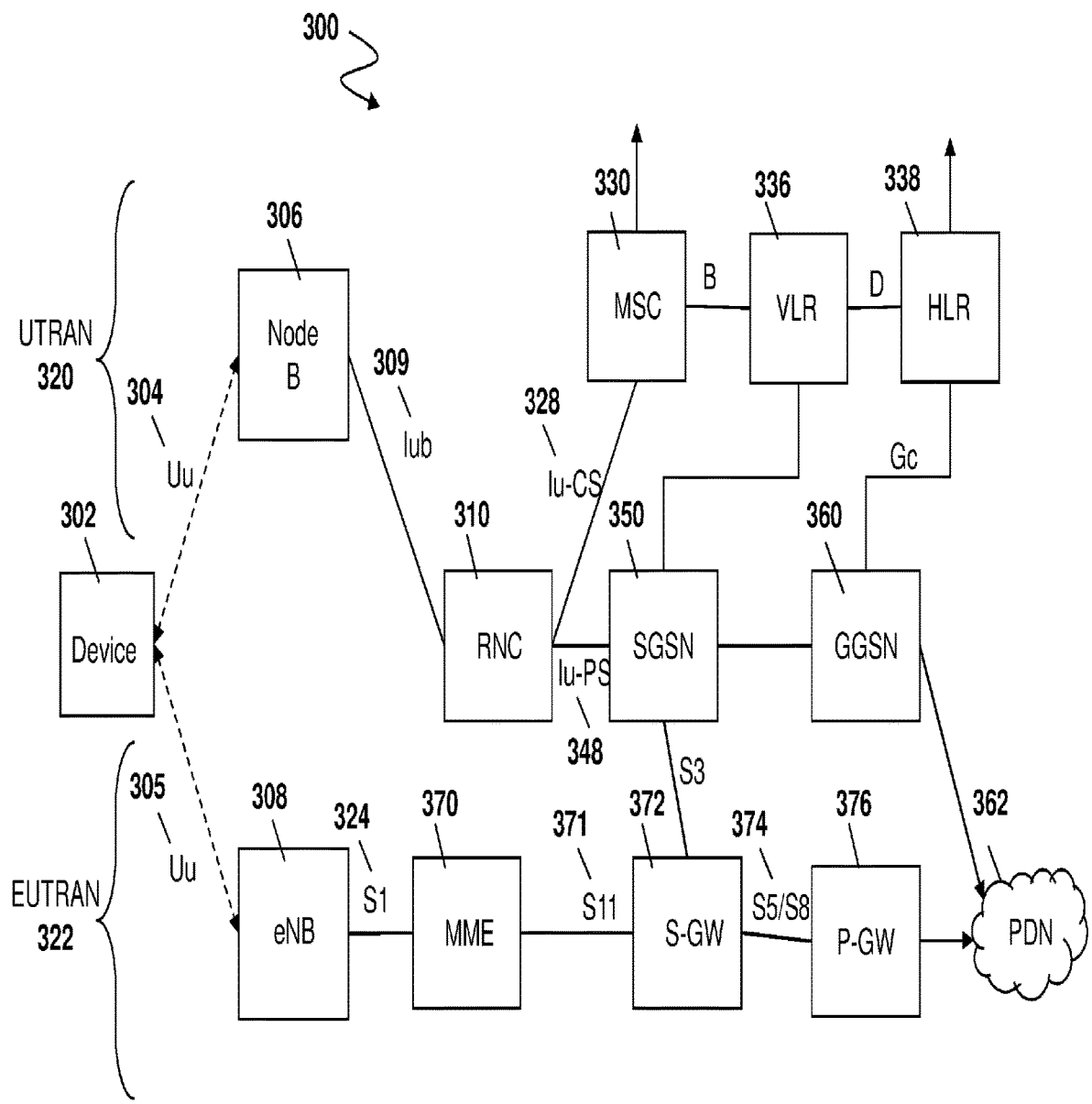
FIG. 3 is a block diagram showing exemplary network architecture.

If sensor apparatus 110, 210, 212 or 214 communicate through a cellular network, one example of a network for such communication is shown with regard to FIG. 3.

FIG. 3 shows a block diagram of a communication system 300 which includes a device 302 which communicates through a wireless communication network.

Device 302 communicates wirelessly with one of multiple access points such as Node Bs 306 in Universal Terrestrial Radio Access Network (UTRAN) 320 or with evolved Node B (eNB) 308 in evolved UTRAN (EUTRAN) 322. Each Node B 306 or eNB 308 is responsible for air interface processing and some radio resource management functions. Further, Node B 306 provides functionality similar to a Base Transceiver Station in a GSM/GPRS networks.

The wireless link shown in communication system 300 of FIG. 3 represents one or more different channels, typically different radio frequency (RF) channels, and associated protocols used between the wireless network and device 302. A Uu air interface 304 is used between device 302 and Node B 306.

Those skilled in art will appreciate that a wireless network in actual practice may include hundreds of cells depending upon desired overall expanse of network coverage. All pertinent network components may be connected by multiple switches and routers (not shown), controlled by multiple network controllers.

Each Node B 306 communicates with a radio network controller (RNC) 310. The RNC 310 is responsible for control of the radio resources in its area. One RNC 310 controls multiple Node Bs 306.

The RNC 310 in UMTS networks provides functions equivalent to the Base Station Controller (BSC) functions in GSM/GPRS networks. However, an RNC 310 includes more intelligence including, for example, autonomous handovers management without involving MSCs and SGSNs.

For eNB 308, RNC functionality may be included in the eNB.

The interface used between Node B 306 and RNC 310 is an Iub interface 309. An NBAP (Node B application part) signaling protocol is primarily used.

UTRAN 320 comprises the RNC 310, Node B 306, the Uu air interface 304, and Iub interface 309.

Circuit switched traffic is routed to Mobile Switching Centre (MSC) 330. MSC 330 is the computer that places the calls, and takes and receives data from the subscriber or from PSTN (not shown).

Traffic between RNC 310 and MSC 330 uses the Iu-CS interface 328. Iu-CS interface 328 is the circuit-switched connection for carrying (typically) voice traffic and signaling between UTRAN 320 and the core voice network. The main signaling protocol used is RANAP (Radio Access Network Application Part). The RANAP protocol is used in UMTS signaling between the Core Network, which can be a MSC 330 or SGSN 350 (defined in more detail below) and UTRAN 320.

For all devices 302 registered with a network operator, permanent data (such as a user's profile) as well as temporary data (such as current location) are stored in a home location registry (HLR) 338.

A Visitor Location Register (VLR) 336 of MSC 330 is responsible for a group of location areas and stores the data of those mobile stations that are currently in its area of responsibility.

Packet data is routed through Service GPRS Support Node (SGSN) 350. SGSN 350 is the gateway between the RNC and the core network in a LTE/GPRS/UMTS network and is responsible for the delivery of data packets from and to the UEs within its geographical service area. Iu-PS interface 348 is used between the RNC 310 and SGSN 350, and is the packet-switched connection for carrying (typically) data traffic and signaling between the UTRAN 320 and the core data network. The main signaling protocol used is RANAP (described above).

The SGSN 350 communicates with the Gateway GPRS Support Node (GGSN) 360. GGSN 360 provides the interface between the UMTS/GPRS network and other networks such as the Internet or private networks. GGSN 360 is connected to a public data network PDN 362 over a Gi interface.

For EUTRAN operations (for example for Long Term Evolution (LTE) operation), EUTRAN 322 comprises eNB 308, the Uu air interface 305, and an S1 interface 324.

eNB 308 communicates with an Evolved Packet Core (EPC), which in part comprises a Mobility Management Entity (MME) 370, Serving Gateway (S-GW) 372 and Packet Data Network (PDN) Gateway (P-GW) 376.

MME 370 controls operation of device 302 through signaling messages and a Home Subscriber Server (HSS).

S-GW 372 acts as a router and forwards data to the P-GW 376 over and S5/S8 interface 374. Communication between MME 370 and S-GW 372 uses an S11 interface 371.

P-GW 376 provides the interface between the LTE network and other networks such as the Internet or private networks. P-GW 376 is connected to a public data network PDN 362 over an SGi interface.

Those skilled in art will appreciate that wireless network may be connected to other systems, possibly including other networks, not explicitly shown in FIG. 3.

Further, while FIG. 3 discusses UMTS and other 3G systems, and LTE and other 4G systems, the present disclosure could equally be used with other networks such as 5G systems.

When a device 302 roams to a network outside of the home network of such device, the device may use an Access Point Name (APN) as the communication interface between the device and the GGSN 360 or P-GW 376. The APN is a gateway between different public networks such as the Global System for Mobile Communications (GSM), the GSM Packet Radio Service (GPRS), 3G or 4G and the public Internet.

Generally, even if the device 302 roams to another network, it will still use the gateway from its home network.

In accordance with one embodiment of the present disclosure, the APN settings on a device 302 may be changed dynamically through communications with a server or cloud service to improve overall system performance. In particular, in accordance with the embodiments described herein, location based information may be used to save network connectivity costs. Such costs include power or current drain costs, as well as overall network connectivity overhead. A mobile device, such as a sensor apparatus, may know its location both when it is in a dynamic or moving state and when it is in a static or fixed state. Further, in some embodiments, data may only be accepted in response to messages sent from the sensor apparatus.

Therefore, in accordance with the present disclosure, information can be used to reduce the cellular connectivity cost overhead and power in order to optimize communications.

Specifically, in one embodiment the server can make a determination for a new access point name for the sensor apparatus and communicate such access point name to the sensor apparatus. Thereafter, on a subsequent reporting cycle, the sensor apparatus may change its APN settings, which may allow packets to be routed on a preferred link that has a lower latency or overhead. Such routing would improve the battery or power performance of the sensor apparatus.

Figure 4:
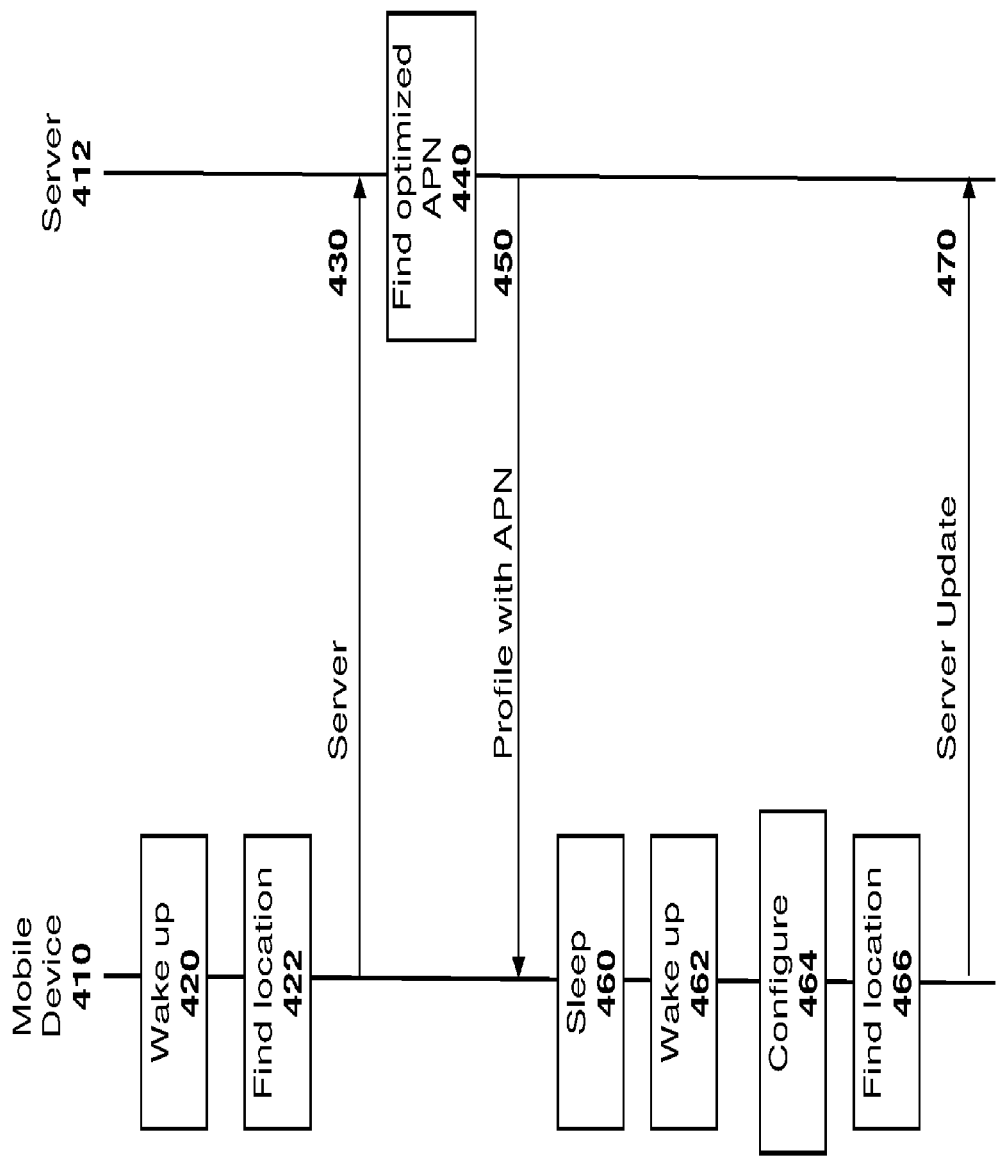
FIG. 4 is a data flow diagram showing a mobile device receiving and configuring a new access point name from a server.

Reference is now made to FIG. 4. In the embodiment of FIG. 4, a mobile device 410 such as a sensor apparatus communicates with a server 412.

As seen at block 420, the mobile device 410 may wake up. In one embodiment, the wake up may be periodic based on a threshold time between sensor reporting events. In other embodiments, the waking up of the mobile device 410 at block 420 may be based on an event occurring. For example, if a high impact event is detected at the mobile device then the mobile device may wake at block 420.

A process at the mobile device 410 then proceeds to block 422 in which the device obtains its current location using an onboard Global Navigation Satellite System (GNSS), such as a Global Positioning System (GPS).

The device may then perform a server update, as shown by arrow 430. The device may provide the server with information regarding the mobile device 410. For example, the update at arrow 430 may include a unique identifier for the update packet. It may further contain information such as the device GPS location, sensor data such as tire pressure, fluid temperatures, among other options. The server update at block 430 utilizes an APN previously configured at mobile device 410.

Server 412 may be a cloud service or other server such as those described in FIG. 1. Server 412 receives the server update at arrow 430 and may extract the location from the update message.

The server 412 may then process the message and, among its functionality, may consider the APN and location of the mobile device 410. The server 412 may use a search, for example using a database associated with server 412, to find the best APN for the sensor apparatus given its current location. The database may further use other information such as historic data to optimize the APN for reduced latency. Such search for an optimized APN is for example, shown in block 440 of the FIG. 4.

In particular, in one embodiment server 412 may receive information from a plurality of mobile devices regarding network conditions and delays experienced by the mobile devices. For example, the information may be conveyed to the server in a server update message 430, or may be conveyed in other messages.

For example, in one embodiment information from each mobile device may include statistics such as, but not limited to, the radio signal strength indicator (RSSI), mobile country code (MCC), mobile network code (MNC), location area code (LAC), absolute radiofrequency channel number (ARFCN), cell ID, available radio access technologies, circuit-switched (CS) and packet switched (PS) registration time, packet data protocol (PDP) request time, whether the mobile is roaming or not roaming, a time to network acquisition, a total network session time duration, among other options. However, in some embodiments a subset of the above may be utilized. In other embodiments, other information may also be provided by the mobile devices to server 412.

The server may then use statistics received from one or more mobile devices to create a profile for a particular location in order to determine an optimized APN for the location. The profile may be created, for example, using a learning algorithm which updates a look-up table accessible by server 412. In some embodiments, the lookup table can be periodically updated with new information to ensure optimized APN selection.

The use of historic data may in some cases benefit from having many mobile devices use a route, or the same route be used by the same mobile device multiple times. In this case, more data can be used to make the determination of the optimized APN.

In other embodiments, instead of, or in addition to, historic data, RSSI coverage maps from mobile network operators may be used to find an optimized APN. Specifically, such coverage maps are provided by the mobile network operators and can assist a server 412 to determine which locations should be using which APNs.

Server 412 may then provide the optimized APN that was found at block 440 back to mobile device 410, as shown by arrow 450. For example, the new APN may be embedded into a profile message that is sent at arrow 450.

The mobile device 410 receives the message at arrow 450 and may store the information prior to going into a sleep state, as shown by block 460.

The next wake state is shown by block 462, at which point the device may configure the communications subsystem with the new APN, as shown by block 464. The configuration of the new APN may involve changing the communication settings at mobile device 410.

The configuration at block 464 may further include, in some embodiments, the mobile device 410 reconfiguring its packet data connection settings using the new APN. After the configuration at block 464, the mobile device 410 may then use the new APN for communication.

The process at the mobile device may then proceed to block 466 in which location information is found.

A mobile device 410 may then perform a server update with server 412, shown by arrow 470, utilizing the new APN that was received in the message at arrow 450. Such new APN generally will result in reduced set up latency and thus battery savings at sensor apparatus 410.

In a other embodiments, instead of updating the APN, other communication parameters may be updated. Thus, in one embodiment, a further communication parameter that may be updated is the subscriber identity at the sensor apparatus.

Figure 5:
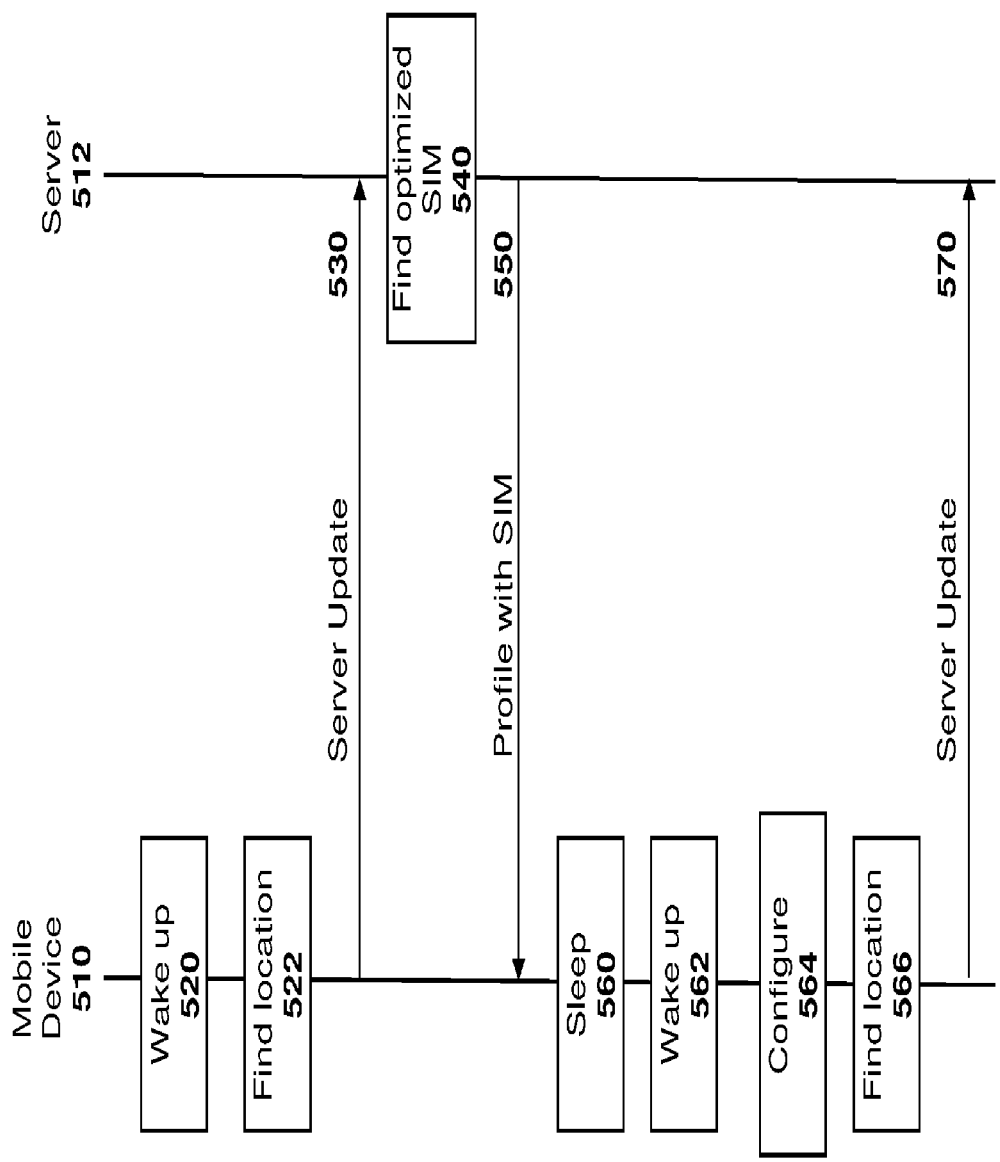
FIG. 5 is a data flow diagram showing a mobile device receiving and configuring a new subscriber identity from a server

Specifically, reference is now made to FIG. 5. In the embodiment of FIG. 5, a mobile device 510 such as a sensor apparatus communicates with a server 512.

The mobile device 510 may wake up at block 520. Such wake up may be periodic or based on events at the mobile device.

From block 520 the process at the mobile device may then proceed to block 522 in which the current location of the mobile device is obtained.

The mobile device 510 may then perform a server update, shown by the message at arrow 530. Such server update may include the current location of the mobile device 510.

Server 512 receives the update message at arrow 530 and may find an optimized subscriber identity for the sensor apparatus at block 540. Such subscriber identity may be based on the current location of the mobile device.

In particular, in one embodiment server 512 may receive information from a plurality of mobile devices regarding network conditions and delays experienced by the mobile devices. For example, the information may be conveyed to the server in a server update message 530, or may be conveyed in other messages.

For example, in one embodiment information from each mobile device may include statistics such as, but not limited to, the radio signal strength indicator (RSSI), mobile country code (MCC), mobile network code (MNC), location area code (LAC), absolute radiofrequency channel number (ARFCN), cell ID, available radio access technologies, circuit-switched (CS) and packet switched (PS) registration time, packet data protocol (PDP) request time, whether the mobile is roaming or not roaming, a time to network acquisition, a total network session time duration, among other options. However, in some embodiments a subset of the above may be utilized. In other embodiments, other information may also be provided by the mobile devices to server 512.

The server may then use statistics received from one or more mobile devices to create a profile for a particular location in order to determine an optimized SIM profile for the location. The profile may be created, for example, using a learning algorithm which updates a look-up table accessible by server 512. In some embodiments, the lookup table can be periodically updated with new information to ensure optimized SIM profile selection.

The use of historic data may in some cases benefit from having many mobile devices use a route, or the same route be used by the same mobile device multiple times. In this case, more data can be used to make the determination of the optimized SIM profile.

In other embodiments, instead of, or in addition to, historic data, RSSI coverage maps from mobile network operators may be used to find an optimized SIM profile. Specifically, such coverage maps are provided by the mobile network operators and can assist a server 512 to determine which locations should be using which SIM profiles.

Once the subscriber identity is obtained, the subscriber identity may be returned in a profile message shown at arrow 550 back to mobile device 510. In one embodiment, APN profiles may be associated with the SIM profile and may be stored at the mobile device 510. In this way, the stored APN profile may be used to perform a server update after a SIM profile change.

On receipt of the message at arrow 550, mobile device 510 stores the subscriber identity information and may then go into a sleep state, shown by block 560.

The mobile device may then wake at block 562.

Based on the information received in the message at arrow 550, the mobile device 510 may then configure a new SIM at block 564. As will be appreciated by those in the art, the configuration of the SIM may include virtually replacing the subscriber identity at the communications subsystem in order to use the new subscriber identity for future communications.

Once the configuration is finished at block 564, the mobile device 510 may then find its location at block 566 and then perform a server update shown by arrow 570 utilizing the new SIM.

Based on the above, packets can be routed to a preferred low latency links using either an updated APN or updated subscriber identity which is received as a new communication parameter from a server between communication cycles. This allows packets to be routed to a preferred link that is lower latency and overhead and therefore improves the battery life on the sensor apparatus.

A server such as servers 412 or 512 may be any network node. For example, one simplified server that may perform the embodiments described above is provided with regards to FIG. 6.

In FIG. 6, server 610 includes a processor 620 and a communications subsystem 630, where the processor 620 and communications subsystem 630 cooperate to perform the methods of the embodiments described herein.

The processor 620 is configured to execute programmable logic, which may be stored, along with data, on the server 610, and is shown in the example of FIG. 6 as memory 640. The memory 640 can be any tangible, non-transitory computer readable storage medium, such as optical (e.g., CD, DVD, etc.), magnetic (e.g., tape), flash drive, hard drive, or other memory known in the art. In one embodiment, processor 620 may also be implemented entirely in hardware and not require any stored program to execute logic functions.

Alternatively, or in addition to the memory 640, the server 610 may access data or programmable logic from an external storage medium, for example through the communications subsystem 630.

The communications subsystem 630 allows the server 610 to communicate with other devices or network elements.

Communications between the various elements of the server 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element for updating communication parameters on a mobile device, the method comprising:

receiving a message from the mobile device, the message comprising a location of the mobile device and information about the mobile device, the information including network delays experienced by the mobile device;

compiling the information about the mobile device with other information received from other mobile devices including network delays experienced by the other mobile devices to create a historic profile for a particular location, thereby creating compiled information;

determining, at the network element, a new communication parameter for the mobile device based on the location of the mobile device and information about the mobile device within the message, the determining performing a search of the compiled information by the network element for the new communication parameter optimized for reduced latency; and transmitting from the network element to the mobile device, the new communication parameter, wherein subsequent communications from the mobile device to the network element utilize the new communication parameter.

2. The method of claim 1, wherein the new communication parameter is a new access point name selected by the network element.

3. The method of claim 1, wherein the information about the mobile device comprises at least one of: a radio signal strength indicator (RSSI); a mobile country code (MCC); a mobile network code (MNC); a location area code (LAC); an absolute radiofrequency channel number (ARFCN); a cell ID; available radio access technologies; a circuit-switched (CS) and packet switched (PS) registration time; a packet data protocol (PDP) request time; whether the mobile is roaming or not roaming; a time to network acquisition; and a total network session time duration.

4. The method of claim 1, wherein the historic profile is created using a learning algorithm to update a lookup table for the particular location.

5. The method of claim 1, wherein the determining the new communications parameter comprises finding the historic profile in a look-up table for the location of the mobile device.

6. The method of claim 1, further comprising receiving Received Signal Strength Indicator (RSSI) coverage maps from at least one network operator, and using the historic profile and the coverage maps to determine the new communications parameter.

7. The method of claim 1, wherein the new communication parameter is a new subscriber identity for a cellular communications system.

8. The method of claim 1, wherein the message comprises a periodic server update.

9. A network element comprising:
a processor; and
a communications subsystem,
wherein the network element is configured to:
receive a message from the mobile device, the message comprising a location of the mobile device and information about the mobile device, the information including network delays experienced by the mobile device;

compile the information about the mobile device with other information received from other mobile devices including network delays experienced by the other mobile devices to create a historic profile for a particular location, thereby creating compiled information;

determine a new communication parameter for the mobile device based on the location of the mobile device and information about the mobile device within the message, the determining performing a search of the compiled information by the network element for the new communication parameter optimized for reduced latency; and transmit from the network element to the mobile device, the new communication parameter, wherein subsequent communications from the mobile device to the network element utilize the new communication parameter.

10. The network element of claim 9, wherein the new communication parameter is a new access point name selected by the network element.

11. The network element of claim 9, wherein the information about the mobile device comprises at least one of: a radio signal strength indicator (RSSI); a mobile country code (MCC); a mobile network code (MNC); a location area code (LAC); an absolute radiofrequency channel number (ARFCN); a cell ID; available radio access technologies; a circuit-switched (CS) and packet switched (PS) registration time; a packet data protocol (PDP) request time; whether the mobile is roaming or not roaming; a time to network acquisition; and a total network session time duration.

12. The network element of claim 9, wherein the historic profile is created using a learning algorithm to update a lookup table for the particular location.

13. The network element of claim 9, wherein the determining the new communications parameter comprises finding the historic profile in a look-up table for the location of the mobile device.

14. The network element of claim 9, wherein the network element is further configured to receive Received Signal Strength Indicator (RSSI) coverage maps from at least one network operator, and using the historic profile and the coverage maps to determine the new communications parameter.

15. The network element of claim 9, wherein the new communication parameter is a new subscriber identity for a cellular communications system.

16. The network element of claim 9, wherein the message comprises a periodic server update.

17. A non-transitory computer readable medium for storing instruction code, which, when executed by a processor of a network element, cause the network element to:
receive a message from the mobile device, the message comprising a location of the mobile device and information about the mobile device, the information including network delays experienced by the mobile device;

compile the information about the mobile device with other information received from other mobile devices including network delays experienced by the other mobile devices to create a historic profile for a particular location, thereby creating compiled information;

determine a new communication parameter for the mobile device based on the location of the mobile device and information about the mobile device within the message, the determining performing a search of the compiled information by the network element for the new communication parameter optimized for reduced latency; and transmit from the network element to the mobile device, the new communication parameter, wherein subsequent communications from the mobile device to the network element utilize the new communication parameter.

* * * * *